US008281404B2

(12) United States Patent
Frey et al.

(10) Patent No.: US 8,281,404 B2
(45) Date of Patent: *Oct. 2, 2012

(54) SYSTEM AND METHOD FOR ADMINISTERING SECURITY IN A CORPORATE PORTAL

(75) Inventors: Bridget J. Frey, San Francisco, CA (US); Matthew S. Markoff, San Francisco, CA (US); Michael E. Smedberg, Oakland, CA (US)

(73) Assignee: Oracle International Corp., Redwood Shores, CA (US)

( * ) Notice: Subject to any disclaimer, the term of this patent is extended or adjusted under 35 U.S.C. 154(b) by 1541 days.

This patent is subject to a terminal disclaimer.

(21) Appl. No.: 11/308,377

(22) Filed: Mar. 20, 2006

(65) Prior Publication Data

US 2006/0161990 A1 Jul. 20, 2006

Related U.S. Application Data

(63) Continuation of application No. 09/896,039, filed on Jun. 29, 2001, now Pat. No. 7,017,183.

(51) Int. Cl.
*H04L 29/06* (2006.01)
(52) U.S. Cl. ............... 726/26; 726/27; 726/28
(58) Field of Classification Search .............. 726/26–30; 707/9

See application file for complete search history.

(56) References Cited

U.S. PATENT DOCUMENTS

| | | | |
|---|---|---|---|
| 5,754,755 A | 5/1998 | Smith, Jr. | |
| 5,819,271 A | 10/1998 | Mahoney et al. | |
| 5,894,554 A | 4/1999 | Lowery et al. | |
| 5,907,837 A | 5/1999 | Ferrel et al. | |
| 5,974,445 A | 10/1999 | Pivnichny et al. | |
| 6,014,137 A | 1/2000 | Burns | |
| 6,014,638 A | 1/2000 | Burge et al. | |
| 6,026,433 A | 2/2000 | D'Arlach et al. | |
| 6,065,120 A | 5/2000 | Laursen et al. | |
| 6,085,191 A * | 7/2000 | Fisher et al. ..................... 707/9 |

(Continued)

OTHER PUBLICATIONS

Method for Providing Personalized Information on the Web, IBM TDB. Oct. 1997, vol. 40, No. 10. pp. 3-6.

(Continued)

*Primary Examiner* — Edward Zee
*Assistant Examiner* — Chi Nguy
(74) *Attorney, Agent, or Firm* — Kilpatrick Townsend & Stockton LLP

(57) ABSTRACT

A method, system, and computer program product for corporate portal security are provided, wherein security information corresponding to an external object imported into the corporate portal is automatically mapped from the object's native security system into the corporate portal system. For each external object imported, the corporate portal maps external users and external groups identified by the native security into corresponding portal users and portal groups according to a predefined mapping process, and stores the results in a manner that associates the external object with those portal users and portal groups. A plurality of database tables and maps determines the outcome of the predefined mapping process. Advantageously, when new external users or groups are added, they are detected by a synchronization agent which then automatically updates the database tables and maps. When custom group security configurations are desired, or when new domains are added, the portal administrator may manipulate a subset of the database tables and maps to achieve the desired configuration. Advantageously, manually intensive operations such as object-by-object security stampings, and/or re-manipulation of individual security settings associated with re-instantiated crawls, are avoided.

20 Claims, 18 Drawing Sheets

U.S. PATENT DOCUMENTS

| | | | |
|---|---|---|---|
| 6,112,192 | A | 8/2000 | Capek |
| 6,128,663 | A | 10/2000 | Thomas |
| 6,134,548 | A | 10/2000 | Gottsman et al. |
| 6,161,126 | A | 12/2000 | Wies et al. |
| 6,185,614 | B1 | 2/2001 | Cuomo et al. |
| 6,327,628 | B1 | 12/2001 | Anuff et al. |
| 6,381,602 | B1 * | 4/2002 | Shoroff et al. ............... 707/9 |
| 6,493,720 | B1 * | 12/2002 | Chu et al. ............... 1/1 |
| 6,643,661 | B2 | 11/2003 | Polizzi et al. |

OTHER PUBLICATIONS

Kerberos Papers and Documentation, http://web.mit.edu/kerberos/www/papers.html.

T. Dierks, et al.. The TLS Protocol Version 1.0, http://www.ietf.org/rfc/rfc2246.txt.

Microsoft Passport Technical White Paper, Mar. 2001, http://www.passport.com/downloads/TechnicalWhitePaper.doc.

Netegrity SiteMinder.RTM. 5.0. http://www.netegrity.com/products/index.cfm?leveltwo=SiteMinder. cited by other, IBM Tivoli Access Manager for Business Integration, http://www.tivoli.com/products/index/access-mgr-bus-Integration/.

IBM Tivoli Access Manager for e-business, http://www.tivoli.com/products/index/access-mgr-e-bus/.

IBM Tivoli Access Manager for Operating Systems, http://www.tivoli.com/products/index/access-mgr-operating-sys/.

Oblix NetPoint. TM. Product Description. http://www.oblix.com/products/netpoint/net.sub.—description.html.

RSA ClearTrust Web Access Management for Secure e-Business, http://www/rsasecurity.com/products/cleartrust/.

Baltimore SelectAccess Introducing SelectAccess 5.0, http://www.baltimore.com/selectedaccess/index.asp.

\* cited by examiner

FIG. 2 — Prior Art

OBJECT SECURITY TABLE — 612

| 1QSalesResults.xls | MYCO/RETAIL |
| | MYCO/EXECS |
| | MYCO/PERRY |
| | MYCO/TOPMGMT |
| 2QSalesResults.xls | MYCO/RETAIL |
| | MYCO/EXECS |
| | MYCO/PERRY |
| | MYCO/TOPMGMT |

(second group braced as 1002)

*FIG. 10*

USER PROFILE TABLE 602

| |
|---|
| MYCO/SARAH |
| MYCO/SAM |
| MYCO/SUE |
| MYCO/PERRY |
| MYCO/PAT |
| MYCO/PAUL |
| MYCO/PETER ~1202 |

GROUP MEMBERSHIP TABLE 606

| GROUP | MEMBERS |
|---|---|
| MYCO/TECHS | MYCO/SUE |
| MYCO/EXECS | MYCO/SARAH |
| MYCO/MGRS | MYCO/SARAH, MYCO/SUE |
| MYCO/RETAIL | MYCO/SAM |
| MYCO/DEV | MYCO/PAUL |
| MYCO/TOPMGMT | MYCO/PAT, MYCO/PETER ~1204 |
| MYCO/ALLMGMT | MYCO/PAT, MYCO/PAUL |
| MYCO/ENDSALES | MYCO/PERRY |

FIG. 12

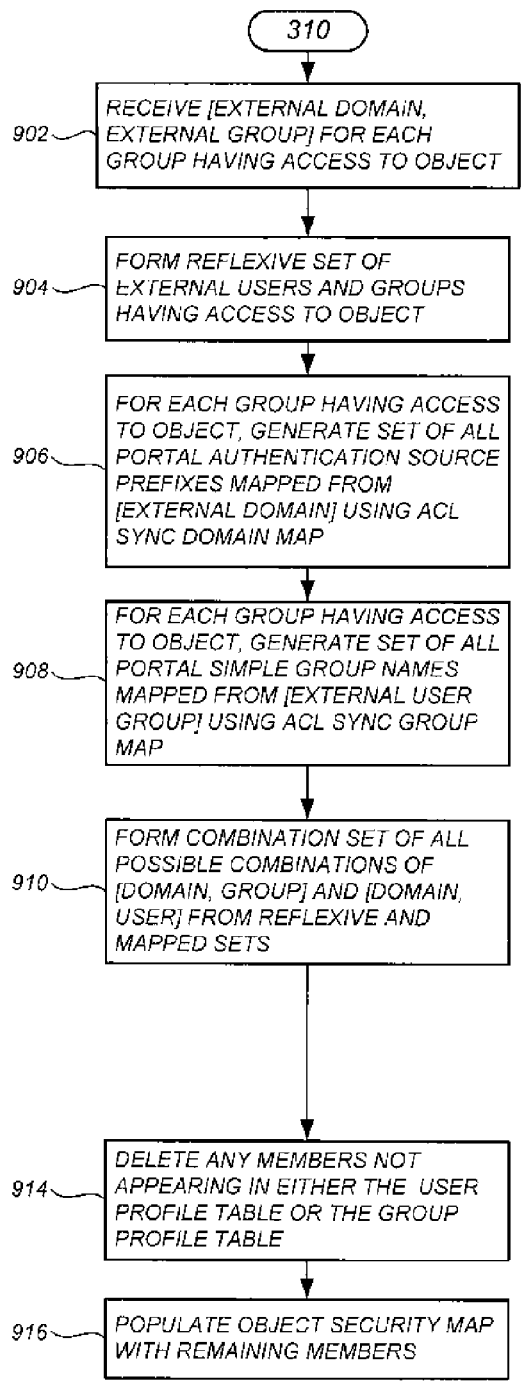
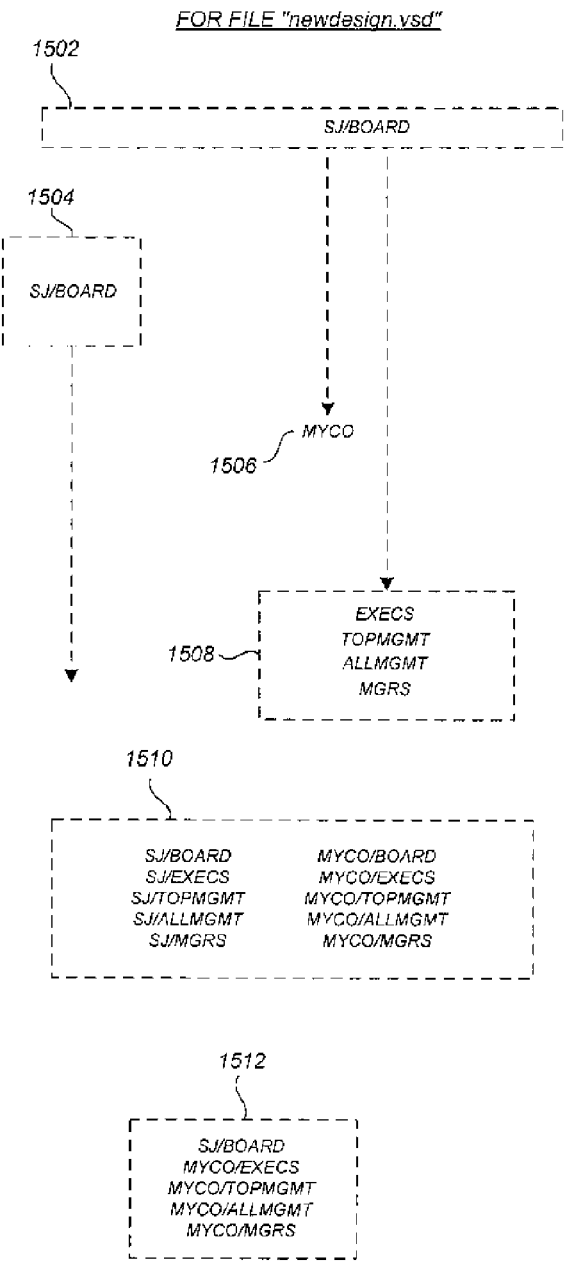
FIG. 15

OBJECT SECURITY TABLE

| | |
|---|---|
| 1QSalesResults.xls | MYCO/RETAIL |
| | MYCO/EXECS |
| | MYCO/PERRY |
| | MYCO/TOPMGMT |
| 2QSalesResults.xls | MYCO/RETAIL |
| | MYCO/EXECS |
| | MYCO/PERRY |
| | MYCO/TOPMGMT |
| newdesign.vsd | SJ/BOARD |
| | MYCO/EXECS |
| | MYCO/TOPMGMT |
| | MYCO/ALLMGMT |
| | MYCO/MGRS |

OBJECT SECURITY TABLE

612

| | |
|---|---|
| 1QSalesResults.xls | MYCO/RETAIL |
| | MYCO/EXECS |
| | MYCO/PERRY |
| | MYCO/TOPMGMT |
| 2QSalesResults.xls | MYCO/RETAIL |
| | MYCO/EXECS |
| | MYCO/PERRY |
| | MYCO/TOPMGMT |
| | SJ/BOARD — 1802 |
| newdesign.vsd | SJ/BOARD |
| | MYCO/EXECS |
| | MYCO/TOPMGMT |
| | MYCO/ALLMGMT |
| | MYCO/MGRS |

FIG. 18

SYSTEM AND METHOD FOR ADMINISTERING SECURITY IN A CORPORATE PORTAL

PRIORITY

This application is a continuation application of U.S. patent application Ser. No. 09/896,039, filed Jun. 29, 2001, and is hereby incorporated by reference.

FIELD OF THE INVENTION

This patent specification relates to portal systems. In particular, it relates to a system and method for administering security in a corporate portal.

BACKGROUND OF THE INVENTION

It is common for today's enterprise networks to comprise scattered arrangements of different hardware and software systems. This is due to the ever-changing data management needs of corporate enterprises, and to continuing advances in the computing hardware and software available to meet those needs. Commonly, different entities within an enterprise (e.g., different departments or work sites) have disparate software applications, groupware systems, or data maintenance architectures/procedures, such that information created or maintained by one entity is not usable by another entity.

Corporate portals, also referred to as intranet portals, have been introduced to increase the accessibility and usability of information stored across heterogeneous systems of an enterprise network. A corporate portal, which is usually overlaid onto an existing enterprise network, is designed to extract content from disparate systems on the enterprise network, and to make that content searchable. The corporate portal is further designed to subdivide the content into taxonomic categories useful to the enterprise, and to allow individual users to access the content using an intuitive, customizable user interface. The customizable user interface is usually web-based to enhance its intuitiveness.

As part of the customization process, the user may configure their display to include one or more portal processing objects. Portal processing objects are adapted to access, process, and display content in a predefined manner appropriate for a class of user. For example, a company executive might import a first portal processing object into her display that illustrates certain sales data in a quarterly summary format. In contrast, a field sales supervisor might import a second portal processing object into his display that shows a real-time "streaming" version of that sales data.

A corporate portal comprises a database, such as a relational database, for storing the organizational schema of the enterprise. To maintain a taxonomic structure for organizing access to content, the corporate portal stores the names of categories and the references to content associated with those categories in a database. Due to storage limitations, and the problems associated with replicating content to a single format, a corporate portal may not store all of the content accessible from the portal. Rather, only references to that content are stored.

A corporate portal further comprises a search engine to automate the organization of text-based content. The search engine allows users to perform general searches for desired content contained across the many heterogeneous systems of an enterprise network.

A corporate portal further comprises a metadata-driven utility to automate the organization of different types of structured content. Corporate portals organize access to structured content including, for example, enterprise resource planning records, data warehousing reports, extensible markup language content, and groupware documents. Such content is often described by metadata that an application stores as columns, fields, or tags to describe the actual data, often for the benefit of other applications or an administrator. Using metadata to organize content provides for meaningful, integrated access to the many repositories of structured information that contain little text. Evaluating metadata also increases the precision of the organizing utility for semi-structured content, which consists of both metadata and text. Because metadata formats and terminology vary, the corporate portal is designed to recognize a wide variety of metadata. Once the metadata is understood in a standard form, the corporate portal can display that information with each reference, much like a card in a card catalog displays the author, subject and title of books in a collection.

Finally, a corporate portal incorporates web publishing tools similar to many document publishing and conversion tools. The portal publishes a taxonomy of content references, but may not necessarily publish the content itself in an HTML format. When a user clicks on a link, the portal may open desktop tools such as a Lotus Notes client or a database query tool instead of a web page, depending on the user's preference and/or privileges.

One example of a corporate portal is the Plumtree Corporate Portal 4.0 available from Plumtree Software, Inc. of San Francisco, Calif. Aspects of the Plumtree Corporate Portal 4.0 are described in a publicly available document, entitled "The Plumtree Corporate Portal 4.0: Technical White Paper," which is available from Plumtree Software, Inc. and which is posted on their public web site at plumtree.com as of the filing date of this disclosure.

Desirable attributes of a corporate portal system include the ability to extract information from a wide variety of different formats (e.g., MICROSOFT OFFICE™, LOTUS NOTES™, VISIO™, HTML, ADOBE PDF™, etc.), and the ability to organize access to that information in a meaningful manner appropriate for the enterprise. A further desirable attribute is high extensibility, i.e., the ability to be extended to accommodate and bring together many heterogeneous enterprise network systems. In addition to being important during high corporate growth periods or merger activity, extensibility is also important for "future-proofing" of the corporate portal, such that information systems and data formats not currently in existence can be accommodated in the future. Yet another important attribute is security, wherein access to sensitive internal information is selectively brokered among different classes or types of employees, or selectively provided to certain users outside the company.

Finally, another crucial feature of a corporate portal is ease of administration. It is important that the person or persons administering and maintaining the corporate portal be provided with easy-to-use tools for keeping the corporate portal up-to-date, secure, and comprehensive, without requiring extensive manual upkeep and intervention. Stated another way, manual effort by a portal administrator should not be wasted on excessively tedious or repetitive tasks.

FIG. 1 shows a corporate portal configuration in accordance with the prior art, comprising a corporate portal system 102 overlaid onto an enterprise network 104. It is to be appreciated that enterprise network 104 of FIG. 1 is a simplified example, and that the preferred embodiments described herein are applicable to enterprise networks that may comprise many heterogeneous sub-networks or domains across many different work groups or spanning many different work sites connected by a wide area network. It is to be further appreciated that while different domains are often physically collocated or intermingled in practice, depending on their purposes and distinctions, different domains herein are shown as physically separate collections for clarity of presentation. In the simplified example of FIG. 1, enterprise network 104 comprises a communications backbone 106, a marketing domain 108, an engineering domain 110, and one or more miscellaneous nodes 112 (e.g., receptionist, executive, etc.). Enterprise network 104 is usually connected to the Internet 114. Marketing domain 108 comprises marketing groupware 109, a marketing archive 118, and a plurality of user terminals 120, such as personal computers, for use by marketing personnel. Engineering domain 110 comprises engineering groupware 122, an engineering archive 124, and a plurality of user terminals 126, such as personal computers or engineering workstations, for use by engineering personnel.

Generally speaking, due to different computing needs and/or different evolutionary paths within the enterprise, the marketing domain 108 and engineering domain 110 often contain vastly different types of computing hardware and software. Thus, for example, the marketing domain 108 may be based on a Lotus Notes groupware architecture, whereas the engineering domain 110 may be based on a Windows NT network platform. Each of these domains will usually maintains its own lists of users and groups in its own distinct format. Still other domains (not shown) of the enterprise network 104 may maintain lists of users and groups according to a standardized format such as LDAP (Lightweight Directory Access Protocol). As known in the art, user refers to a particular person using the system (e.g., Bob, Mary, Steve, etc.), while a group refers to a logical collection of users (e.g., Executives, Engineers, Marketing, Company_Picnic_Committee, etc.). As used herein, "external users" and "external groups" refer to users and groups as identified by their native domains. In contrast, "portal users" and "portal groups" refers to users and groups as identified by the corporate portal system 102.

Corporate portal system 102 comprises a web server 128, a portal processing object server 130, a job server 132, a first data storage server 134, and a second data storage server 136 coupled as shown in FIG. 1. It is to be appreciated that the elements 128-136 are shown on separate hardware systems and coupled over a network due to practical implementation requirements. However, the different elements of corporate portal 102 may be implemented on different combinations of hardware and networking connections, and may even be implemented on a single computing machine, although such a configuration is generally not recommended for performance reasons.

Portal processing object server 130 has a connection to web server 128 for performing the role of serving requests from portal processing objects being executed for portal users. Job server 132 comprises a search engine 138 and a file crawler 140. Data storage server 134 comprises a relational database 142 into which is stored directory tables 146 comprising metadata about selected objects (e.g., documents, databases, executables, and other objects) contained in the enterprise network 104 (hereinafter referred to as "external objects" because they are external to the corporate portal). The contents of directory tables 146 forms a metadata object corresponding to each external object, often referred to as a card for that external object. Relational database 142 further comprises an access control list 144 comprising, for each external object, a list of the portal users and portal groups that may access that object. The second data storage server 136 comprises a text index 150 used in conjunction with the search engine 138, and a set of portal processing object snapshots 152 for use by the portal processing object server 130.

In operation, when the file crawler 140 (which may comprise Notes, Exchange, web crawlers, etc.) discovers a new document (or other new object) in the enterprise network 104, the document is given an object identifier (OID). The document is also text-indexed by search engine 138, with the resulting data stored in text index 150. Also, metadata corresponding to the new document (e.g., title, location, author, creation date, type, and many other attributes) is stored in directory tables 146 to form a metadata object (i.e., card) 148 for that document. For clarity of explanation, the examples presented herein are for a common situation in which newly discovered object is a document, such as a word processing file, HTML file, spreadsheet file, or the like. It is to be appreciated, however, that the newly discovered object may generally be any type of object (e.g., XML file, executable, database file, directory object, groupware related reference files, executables, or objects, etc.) in accordance with the preferred embodiments described herein.

Finally, after indexing and metadata object creation, the access control list 144 is updated to include the object identifiers (OIDs) of the portal users and portal groups that may access that document. For clarity of explanation, the presence of an OID associated with a document, user, group, or other object is established herein by reference to the object name itself. Thus, for example, a reference to a user (cn=John, OID=0xf9c6b332) shall simply be "John," it being understood that the corporate portal system will actually be storing or manipulating the OID corresponding to John. When a user logs onto the corporate portal and performs a search, a first set of documents may satisfy their search parameters. For each document in that set, the access control list 144 is checked to see if that portal user has access permission to that document, or if that user is a member of a portal group having access permission to that document. The portal user is only presented with a listing of documents for which they have access permission.

More particularly, the portal user is presented with information selected from the metadata object corresponding to that document (e.g., document title, author, abstract, hyperlink to the document, etc.). The portal user may then instantiate a document viewing session, in which web server 128 accesses the document from its location on the enterprise network 104 and presents it to the user in a browser window. Alternatively, depending on the configuration of that specific corporate portal for that user, the user may be required to separately log in to the domain containing the document (using an external user name and password) and view it using their own desktop software applications. Many other scenarios are possible depending on the configuration of the corporate portal 102 and the enterprise network 104. For purposes of the present disclosure, it is mainly important to note that documents to which a portal user does not have access permission are kept invisible to that portal user by the corporate portal 102.

Problems arise in the administration of the prior art corporate portal 102 with respect to the administration of the access control list. In particular, a disadvantageous trade-off is presented between proper document security settings in the access control list versus the amount of corporate portal system administrator time and effort required to maintain it. According to the prior art of FIG. 1, the file crawling sessions that discover new documents and populate the access control list (often referred to as "crawls") are administered by content managers 154 and 156. For example, the content manager 154 may be responsible for marketing content present on the corporate portal system, while the content manager 156 may be responsible for engineering content present on the corporate portal system. Content managers 154 and 156 are expected to have a close connection to the content and users in their particular area of responsibility. More particularly, content managers 154 and 156 are expected to have a practical knowledge of the external users and external groups that may be associated with documents' native security settings, and a practical knowledge of how those settings should be reflected in the corporate portal security system with respect to portal users and portal groups.

FIG. 2 shows steps for crawling and assigning document security settings in accordance with the prior art. At step 202, the content manager configures crawl parameters. For example, the content manager will specify the domains, directories, file types, etc. for a crawl. The content manager may specify that the crawl be executed on a one-time basis, on a regular periodic basis (e.g., nightly, weekly), or according to a custom schedule. At step 204, while configuring the crawl parameters, the content manager specifies the security settings for the documents that will be imported by that crawl, in particular specifying the portal users and portal groups that will have access to the imported documents. After crawling begins, at step 206 the file crawler finds a new document meeting the crawl parameters, and at step 208 the document is imported into the corporate portal through the generation and storage of an associated metadata object in the relational database 142. At step 210, the document is "stamped" with access permissions, i.e., the access control list 144 is populated for that document according to the pre-specified portal users and portal groups specified by the content manager. At step 212, the content manager reviews the crawl results, and may manually change access settings in the access control list 144 if required.

Disadvantageously, the method of FIG. 2 results in corporate portal security settings having limited precision and extensibility. First, the security for each document imported into the corporate portal is extrinsically dictated by the corporate portal system itself (via the content manager), rather than by external network administrator or external user who created the document. In large corporations, the content manager may be substantially removed from an understanding of the access control required for documents in a given location. While the content manager might attempt to access and emulate the local security settings for documents, this would be manually intensive task that is made even more difficult by the many heterogeneous security systems in the enterprise network. Often, the content manager will take the "safe road" and provide very limited access to crawled documents (e.g., by doing per-domain crawls and only allowing portal groups corresponding to that specific domain to view the document). This can defeat the very purpose of the corporate portal system, which is to enhance intelligence and best-practices sharing among the enterprise network users. Alternatively, the content manager might "throw their hands up" and allow every portal group to see the document, which might compromise corporate security policies. Accordingly, if the content administrator is unwilling or unable to shoulder an intensive, laborious workload in properly keeping up the access control list, the appropriateness of the settings in the access control list suffers.

Furthermore, the extensibility of the corporate portal security settings is limited in the prior art method of FIG. 2. It is often the case that entire domains, users, and groups are added to the corporate portal all at once (e.g., in a corporate acquisition or merger scenario). In such a situation, members of newly added portal groups will generally not be able to view currently existing documents in the corporate portal system, unless a new set of crawls is performed, wherein new custom parameters must be added specifying which of the newly added portal groups should see the documents, in addition to any old custom parameters for current portal groups. Alternatively, the content manager may individually "stamp" the newly allowed portal groups onto the cards of the existing documents. Either of these scenarios represents a substantial, administration-intensive task. Similar tasks would also need to be performed on new documents from the added domain with respect to portal groups that were already in existence.

Accordingly, it would be desirable to provide a corporate portal in which security settings are more easily administered.

It would be further desirable to provide a corporate portal in which object security settings are established and maintained with increased precision and relevance.

It would be still further desirable to provide a corporate portal security system that is more extensible and does not require excessive manual intervention upon the addition of new domains, users, or groups to the enterprise network.

SUMMARY OF THE INVENTION

A method, system, and computer program product for corporate portal security are provided, wherein security information corresponding to an external object imported into the corporate portal is automatically mapped from the object's native security system into the corporate portal system. Importation of the external object includes the steps of generating a metadata object corresponding to the external object and storing the metadata object in a database of the corporate portal. The mapped security information is also stored in the portal database, or in an associated database. For a given external object for which the corporate portal has an associated metadata object and a body of mapped security information, portal user information is compared in real-time to the mapped security information to determine whether to expose the associated metadata object to that portal user. In one preferred embodiment, the mapped security information comprises read access permissions of portal users and portal groups.

For a given external object, the native security system maintains access permissions in terms of external users and external groups. According to a preferred embodiment, the corporate portal maps the external users and external groups into corresponding portal users and portal groups according to a predefined mapping process, and stores the results in a manner that associates the external object with those portal users and portal groups. In one preferred embodiment, the results are stored in an object security table in the portal database.

Information affecting the predefined mapping process is stored in a plurality of tables in the portal database, including a user profile table, a group profile table, and a group membership table. Portal users are identified in entries of the user profile table by a concatenation of a portal domain identifier and a user name used by the native external domain for that user. Portal groups are identified in entries of the group profile table by a concatenation of a portal domain identifier and a group name used by the native external domain for that group. The group membership table maps the portal user identifiers into the portal group identifiers according to known group membership information.

Further information affecting the predefined mapping process is stored in an access control synchronization map in the portal database. The access control synchronization map comprises a domain synchronization map and a group synchronizations map. The domain synchronization map comprises external domain entries mapped into portal domains. The group synchronization map comprises external group names mapped into portal simple group names. The contents of the domain synchronization map and a group synchronizations map may be manipulated by a portal administrator such that desired mappings from external users and external groups to portal users and portal groups is achieved.

Advantageously, when new users or groups are added to the enterprise network, they can be automatically detected by a synchronization agent, which then automatically populates the user profile table, group profile table, and group membership table. These new users and/or groups are automatically accommodated during subsequent importations of security settings associated with imported objects into the object security table, unless optional custom security settings are desired. When optional custom security settings are desired, an easy-to-use interface allows for ready population of the access control synchronization map by the portal administrator to effectuate the desired security configuration. When a new domain is added to the enterprise network, the portal administrator only needs to manipulate settings in the access control synchronization map, and subsequent user/group synchronizations and object security importations will automatically populate the object security table.

According to one preferred embodiment, for a given external object, the predefined security mapping process comprises the step of forming a reflexive set of external users and external groups having access to the object, each member being expressed as a concatenation of the external domain and the external user or external group. Each domain indicated in the external users and groups is then mapped to one or more portal domains using the domain synchronization map. Each group indicated in the external users and groups is then mapped to one or more portal simple group names using the group synchronization map. A candidate set of all possible pairings are then formed between (i) all indicated domains, and (ii) all indicated external group and portal simple group names. The candidate set is then compared to the user profile table and the group profile table, and any candidate member not appearing in either table is deleted. For that external object, the object security table is then populated with the remaining members of the candidate set.

BRIEF DESCRIPTION OF THE DRAWINGS

FIG. 10 shows an object security table corresponding to the enterprise network of FIG. 8 subsequent to application of the security mapping steps of FIG. 9;

FIG. 12 illustrates an updated user profile table and an updated group membership table corresponding to the enterprise network of FIG. 11;

FIG. 15 illustrates steps for mapping external security information into a corporate portal system in accordance with a preferred embodiment, the object being contained in a newly added external domain;

FIG. 16 shows an object security table corresponding to the enterprise network of FIG. 13 subsequent to application of the security mapping steps of FIG. 15;

FIG. 18 shows an object security table corresponding to the enterprise network of FIG. 13 subsequent to application of the security re-mapping steps of FIG. 17.

DETAILED DESCRIPTION

Figure 3:
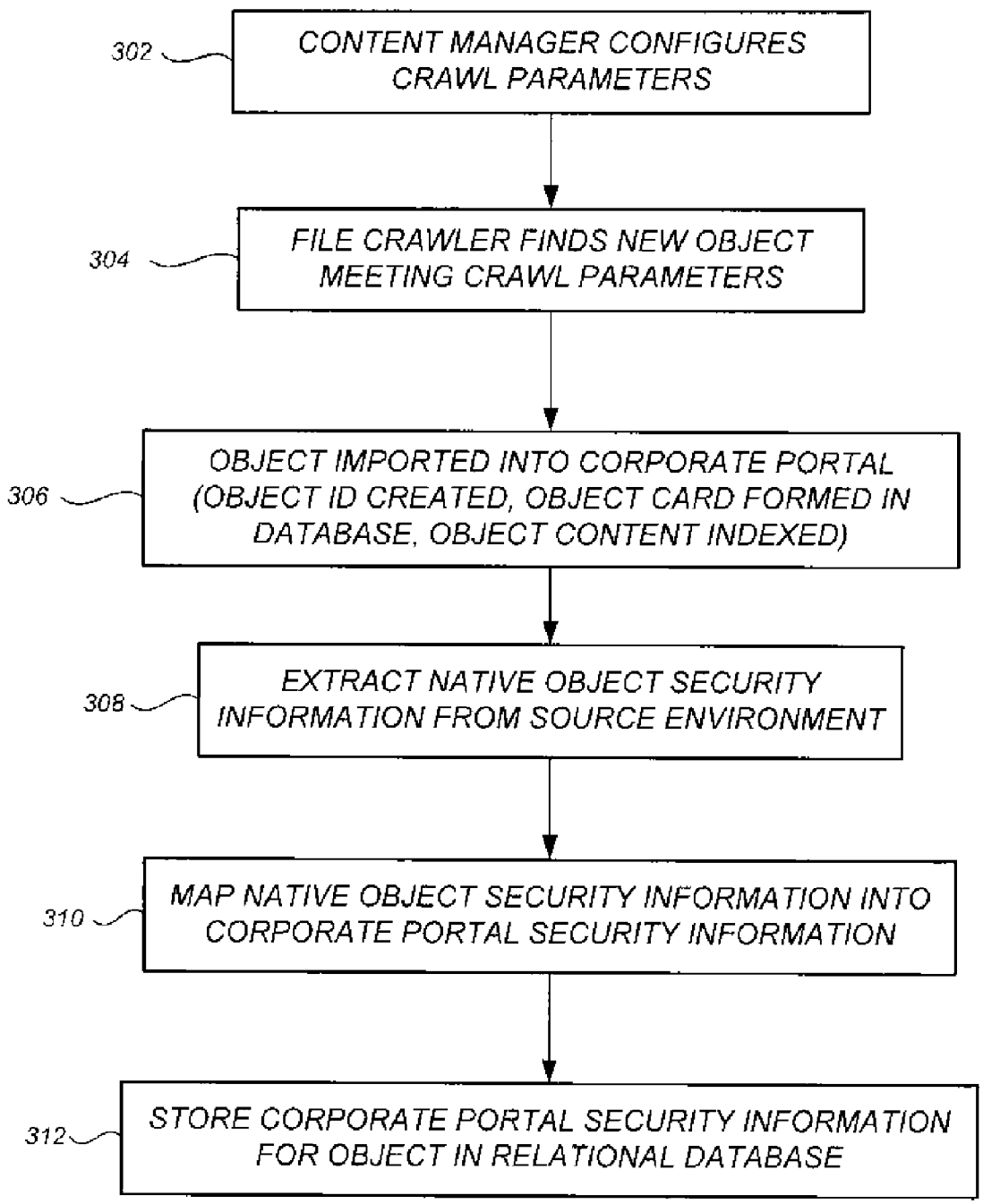
FIG. 3 illustrates corporate portal security administration steps in accordance with a preferred embodiment.

FIG. 3 shows corporate portal security administration steps in accordance with a preferred embodiment. At step 302, the content manager configures crawl parameters. At step 304, subsequent to instantiation of the crawler, a new object is found in an external domain that meets the crawl parameters. At step 306, the object is imported into the corporate portal, including the steps of creating of an object ID, creating a corresponding metadata object (i.e., card), and indexing the object content. At step 308, native object security settings are extracted from the external domain containing the external object. At step 310, the native object security settings are mapped into corporate portal security information. At step 312, the corporate portal security information corresponding to the object is stored in an object security table of a portal database, as will be described further infra.

Figure 4:
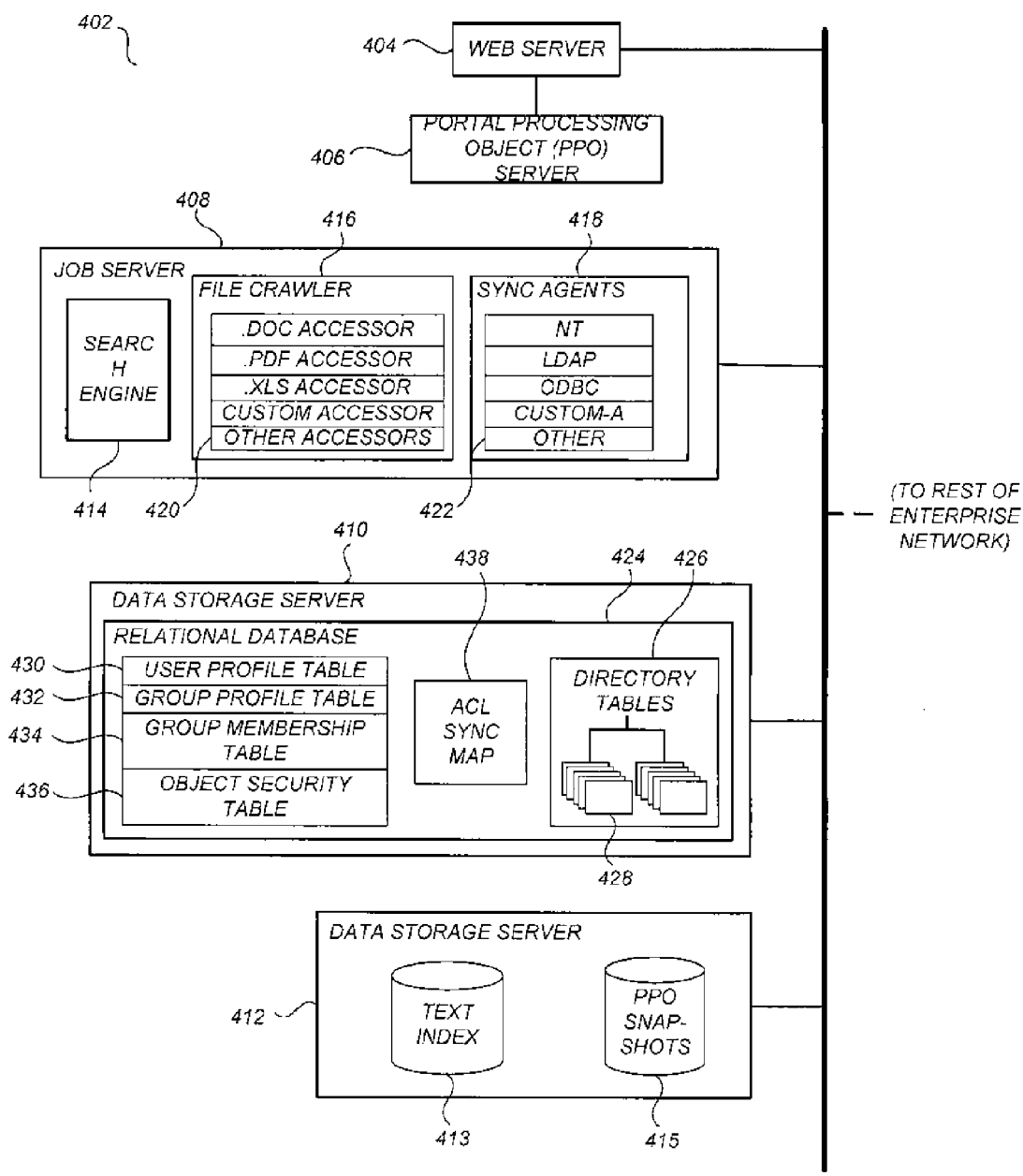
FIG. 4 illustrates a block diagram of a corporate portal system in accordance with a preferred embodiment.

FIG. 4 illustrates a block diagram of the corporate portal system 402 in accordance with a preferred embodiment. Corporate portal system 402 comprises a Web server 404 similar to the Web server 128 of FIG. 1, a portal processing object server 406 similar to the portal processing object server 130 of FIG. 1, and a second data storage server 412 similar to the second data storage server 136 of FIG. 1. Corporate portal system 402 further comprises a job server 408 comprising a search engine 414 similar to the search engine 138 of FIG. 1, and a crawler 416 similar to the file crawler 140 of FIG. 1. Additionally, however, the crawler 416 comprises a plurality of accessors 420 designed to extract information from the various types of files and other objects that may be contained on the enterprise network, e.g., .doc files, .pdf files, .xls files, and other object types. The crawler 416 is extensible such that if additional document types are introduced into the future, additional accessors 420 can be added to accommodate them.

It is to be appreciated that while the crawler 416 may be referred to as a file crawler in some examples, the preferred embodiments are not so limited, and the crawler 416 may generally comprise any software or algorithm adapted to detect and/or import external objects or other items into the corporate portal system.

In accordance with a preferred embodiment, crawler 416 further comprises the capability to extract from the file system of a discovered object the native security settings corresponding to that object. The location and format of the native security settings will depend upon the type of system used in the external domain (e.g., NT™, LOTUS NOTES™, SOLARIS™, etc.), and a method of extracting this information will be readily apparent to a person skilled in the art upon review of the appropriate documentation for such system.

Job server 408 further comprises a group of synchronization agents 418 that are periodically instantiated to detect the presence of added or deleted external users on the enterprise network, as well as added, deleted, or changed external groups on the enterprise network. As indicated in FIG. 4, different synchronization agents 422 are required depending on the type of the external domain directory structure being examined (e.g., NT™, LDAP™, ODBC™, etc.). In accordance with a preferred embodiment, when a synchronization agents detects new or changed external user or group information, it automatically populates the user profile table, group profile table, and group membership table with the new information. As will be apparent from the descriptions infra, these new users and/or groups are automatically accommodated during subsequent importations of security settings associated with imported objects, unless optional custom security settings are desired. When optional custom security settings are desired, the portal administrator may instantiate an easy-to-use administrative interface for updating information in the portal database 424 used to map external security information into corporate portal security information, in a manner to be described infra.

Job server 408 or data storage server 410 further comprise an internal portal directory (not shown) for maintaining portal user information and portal group information. In general, any type of commercial, custom, or proprietary directory system may be used to store the portal user and portal group information. The internal portal directory is distinct from external directories which lie outside the portal system and which are associated with their respective external domains. The external directory information may be accessible via NT API calls, LDAP, or via other means as appropriate. Accessibility via LDAP is relatively simple to use, and LDAP is often used as a common export format from proprietary directory systems such as Lotus Notes.

Figure 1:
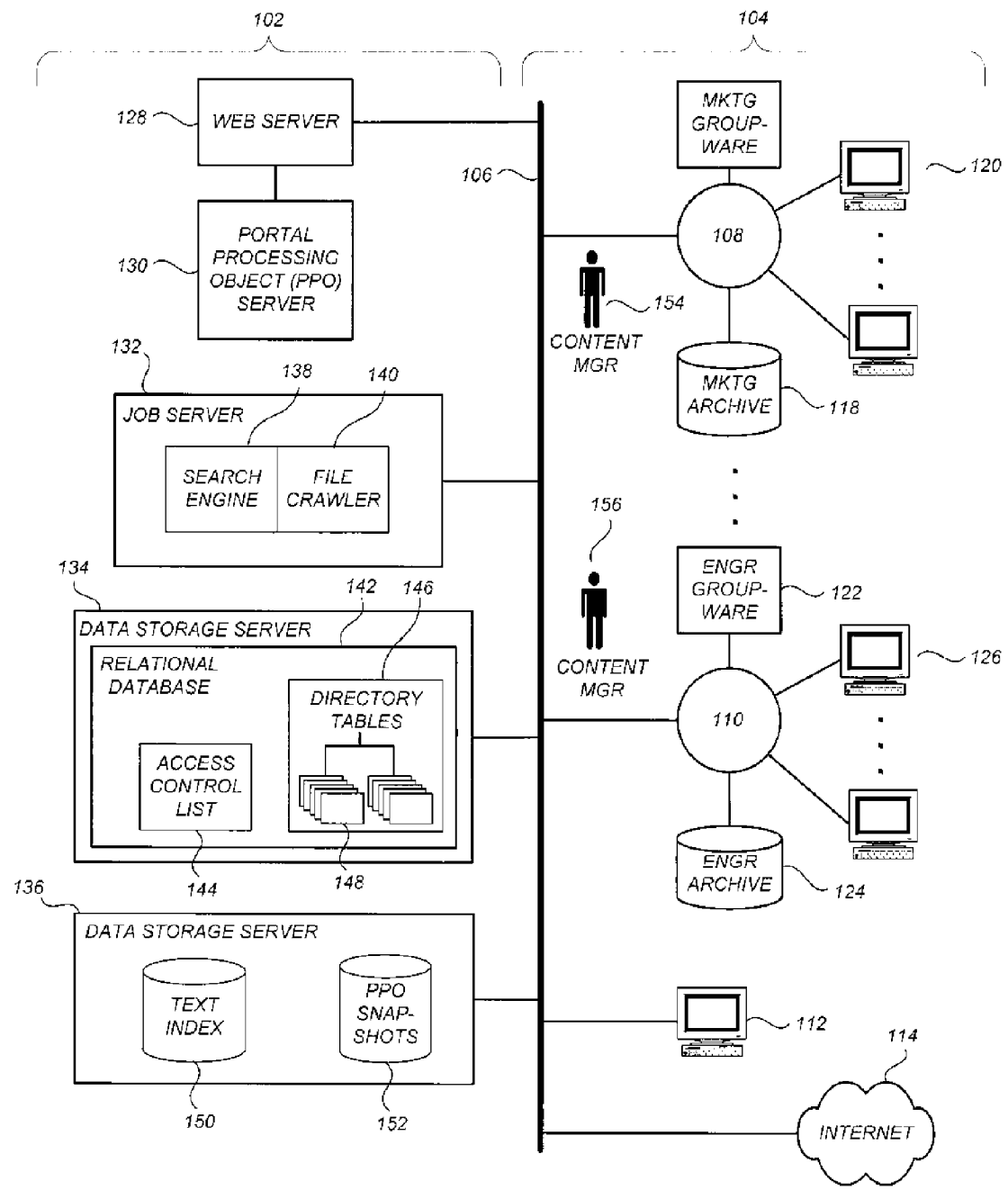
FIG. 1 illustrates an enterprise network and a corporate portal system overlaid thereon in accordance with the prior art.
Figure 2:
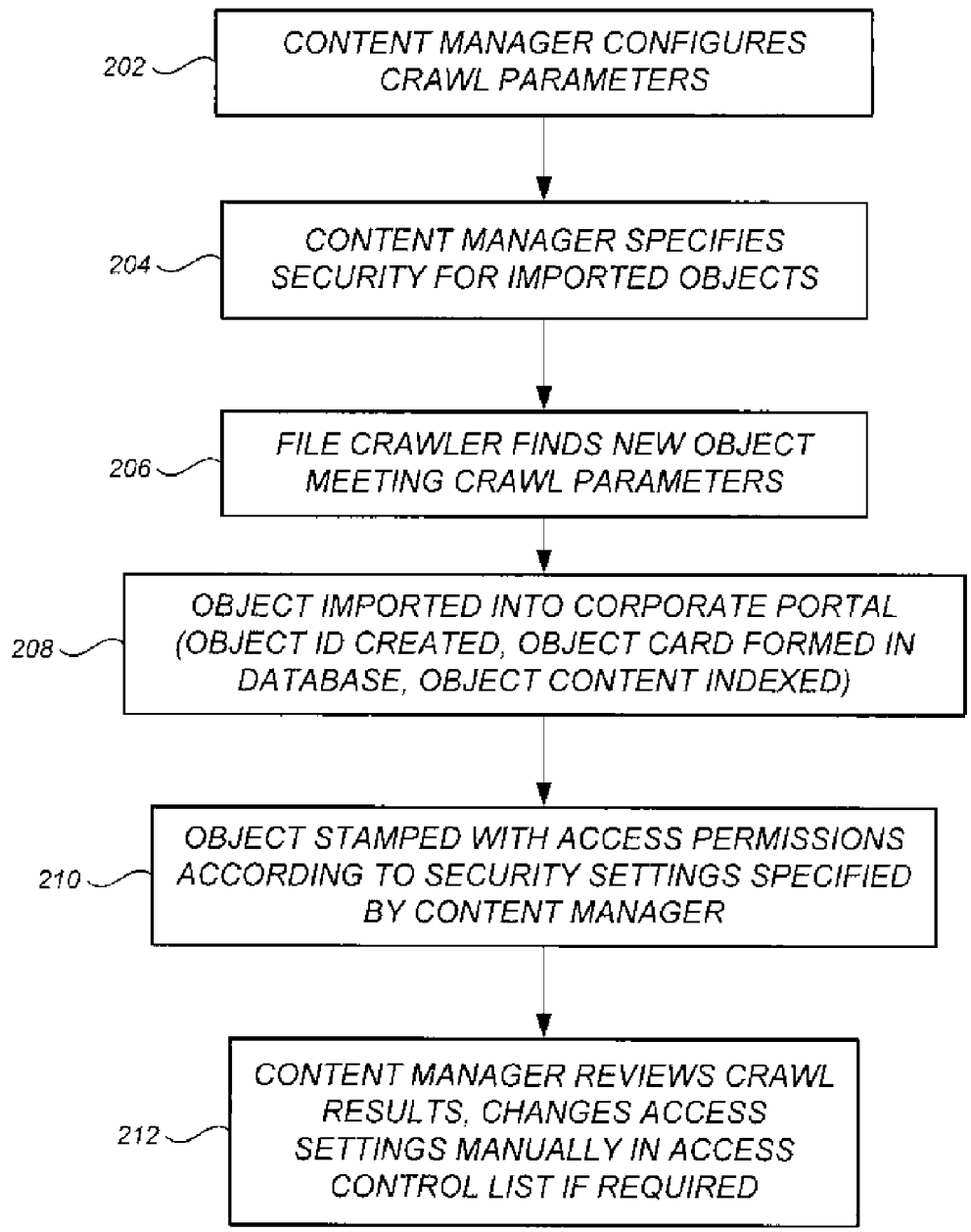
FIG. 2 illustrates corporate portal security administration steps for an imported object in accordance with the prior art.

Portal database 424 comprises directory tables 426 similar to the directory tables 146 of FIG. 1, and metadata objects (cards) 428 similar to the metadata objects 148 of FIG. 1. While in the preferred embodiment the portal database 424 is presented as a relational database, it is to be appreciated that any database system capable of achieving similar functionalities could be used, e.g., a functionally equivalent system could be built on top of on object oriented database, or on top of a proprietary database type. In accordance with a preferred embodiment, portal database 424 further comprises a user profile table 430, a group profile table 432, a group membership table 434, an object security table 436, and an ACL (access control list) sync map 438 (hereinafter synchronization map 438), these tables and maps comprising information as will be described further infra.

Figure 5:
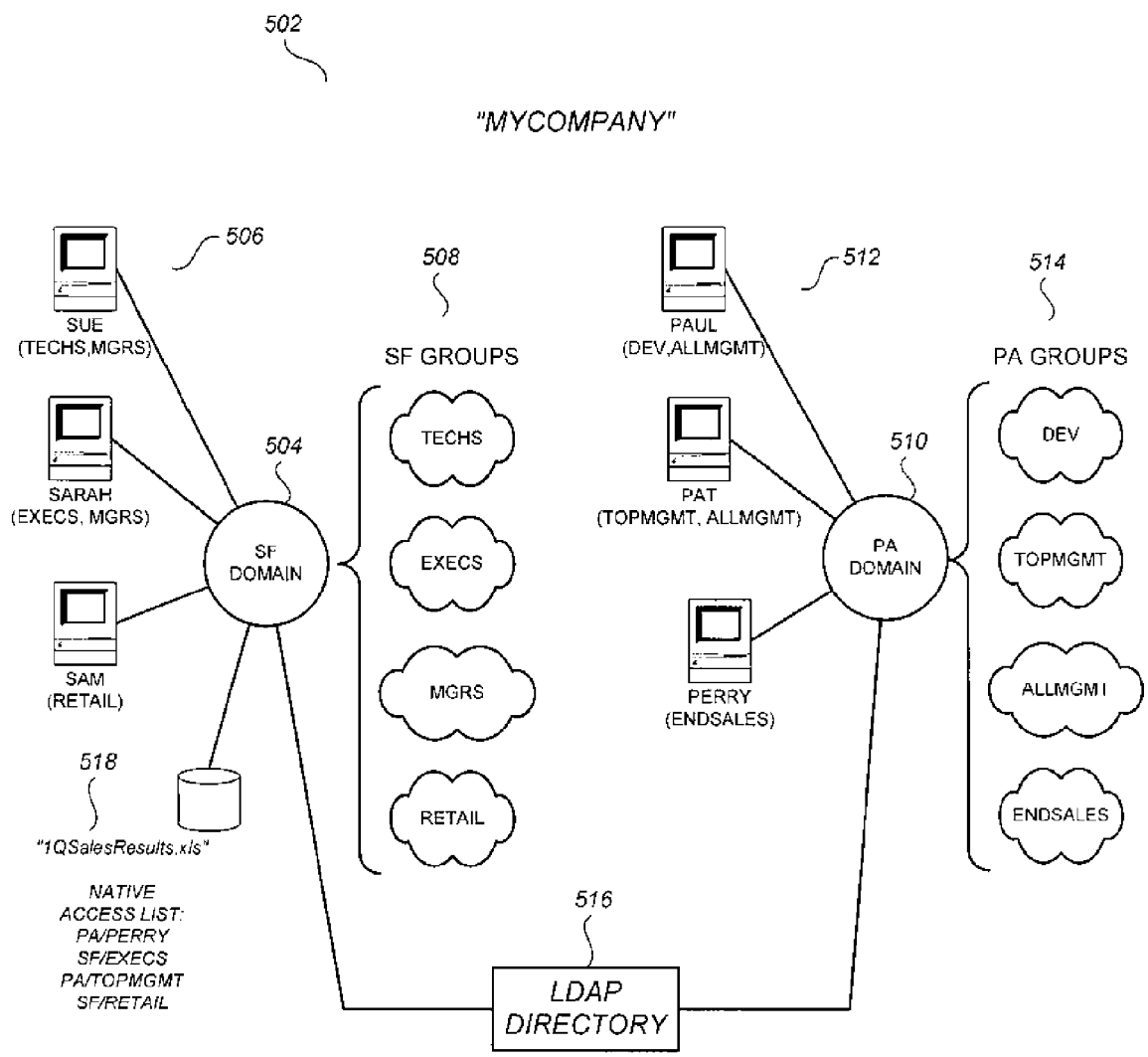
FIG. 5 illustrates an exemplary enterprise network in a first configuration for use with a corporate portal system in accordance with a preferred embodiment.

FIG. 5 illustrates an exemplary enterprise network 502 in a first configuration for use with a corporate portal system in accordance with a preferred embodiment, which is used herein to describe preferred population of the security mapping information stored in portal database 424. Enterprise network 502 comprises a first domain 504 ("SF") having external users 506 (Sue, Sarah, Sam) that are members, in different combinations, of the groups 508 (Techs, Execs, Mgrs, Retail). The SF domain 504 further comprises a file object 518 that is an Excel file "1QSalesResults.xls." Enterprise network 502 further comprises a second domain 510 ("PA") having external users 512 (Paul, Pat, Perry) that are members, in different combinations, of the groups 514 (Dev, Topmgmt, Allmgmt, and EndSales). For purposes of this simple example, a common LDAP directory 516 is provided, and accordingly both domains are aware of each other and their respective users and groups.

Figure 6:
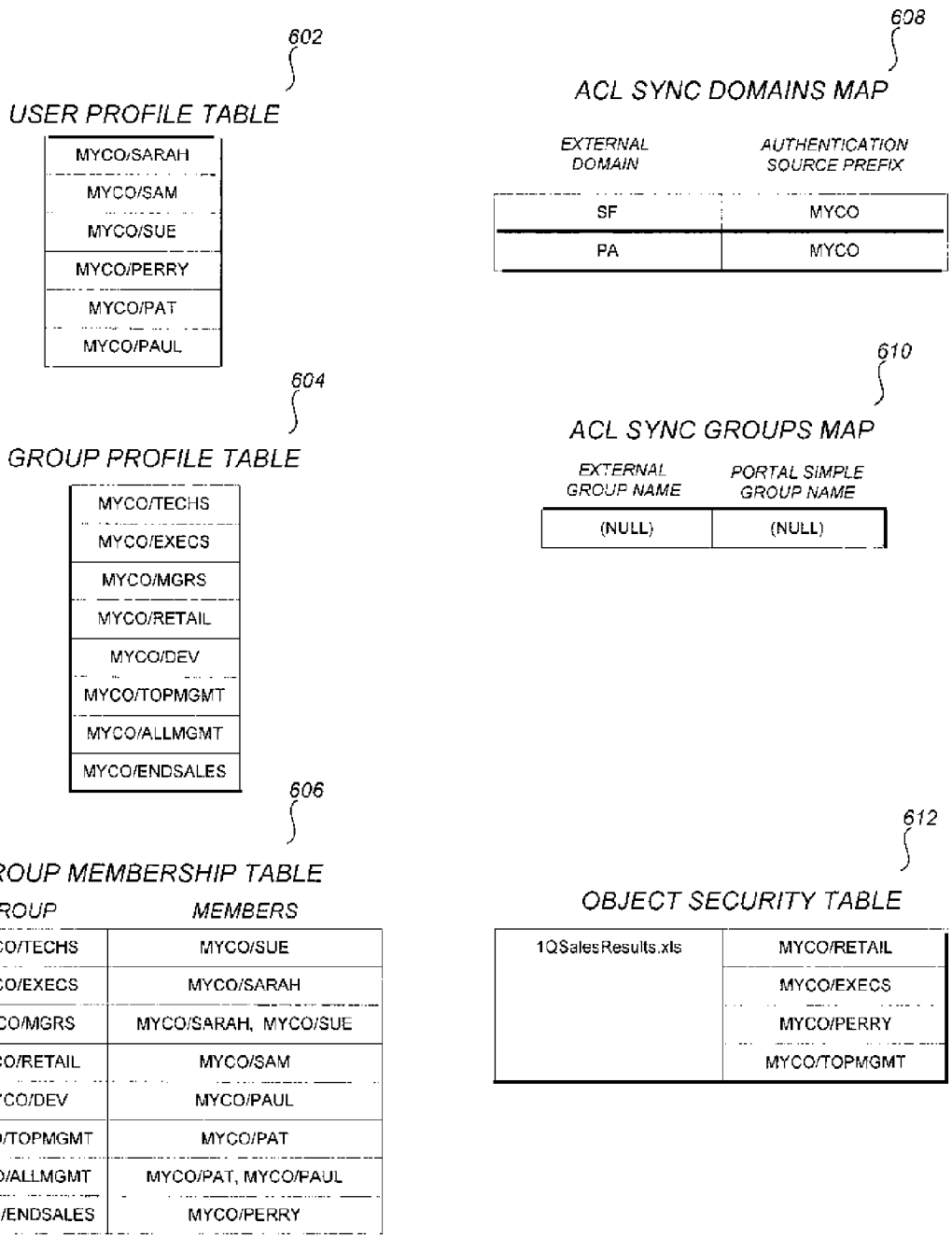
FIG. 6 illustrates database information stored in a corporate portal system corresponding to the enterprise network configuration of FIG. 5.

FIG. 6 illustrates portal database information stored in a corporate portal system corresponding to the enterprise network configuration of FIG. 5. For purposes of the example of FIGS. 5-6, it is to be assumed that object importation and security mapping has already taken place for the document 1QSalesResults.xls. In addition to being users in their own domains ("external users"), the users Sue, Sarah, Sam, Paul, Pat, and Perry are also users of the corporate portal ("portal users"). Portal database 424 comprises a user profile table 602, populated with entries corresponding to each portal user, each entry comprising a concatenation of a portal domain corresponding to the user and the user's common name as used by their external domain. For purposes of the example of FIGS. 5-6, all of the portal users are considered members of the same portal domain MYCO. A portal domain is essentially a "virtual" domain that exists only in the portal's own world, and serves as a kind of authentication source prefix during the security mapping procedure, and thus the term authentication source prefix may be used interchangeably with portal domain herein. For clarity of explanation, the corporate portal system of FIGS. 5-6 is in somewhat of a "primordial" state—no new external domains or external groups have yet been added. As will be seen infra, the structure of the information of FIG. 6 accommodates ready extensibility for the addition of new external domains and external groups.

Portal database 424 further comprises a group profile table 604 populated with entries corresponding to each portal group, each entry comprising a concatenation of a portal domain corresponding to the group and the group's common name as used by its external domain. A group membership table 606 is also provided which maps portal users into portal groups according to known group memberships. Generally speaking, the user profile table 602, a group profile table 604, and group membership table 606 is usually populated by a portal administrator, although the scope of the preferred embodiments is not so limited and automated methods may be readily designed for population of these tables in light of the present disclosure.

Portal database 424 further comprises a synchronization map comprising a domain synchronization map 608 and a group synchronization map 610. Domain synchronization map 608 maps external domains (which will be contained in the extracted native security information for discovered external objects) into portal domains/authentication source prefixes. In a simplified example of FIGS. 5-6, there are only two entries, in which the external domains SF and PA map into the single portal domain MYCO. Group synchronization map 610 maps external group names into portal simple group names, and comes into play upon the addition of new groups and/or domains to the enterprise network. Accordingly, since the enterprise network is in its "primordial" state in the current example, the group synchronization map 610 remains unpopulated.

Portal database 424 further comprises an object security table 612 which is used to enforce the corporate portal security settings in accordance with a preferred embodiment. For the present example, in which only a single file has been imported into the corporate portal, there is only a single object entry together with the portal users and portal groups that have access to the object (more particularly, having exposure to the metadata object corresponding to the external object). It is readily seen how the native security settings for the external object, which grant access to PA/Perry, SF/Execs, PA/Topmgmt, and SF/Retail, would generate corresponding portal access settings of MYCO/Perry, MYCO/Execs, MYCO/Topmgmt, and MYCO/Retail.

Figure 7:
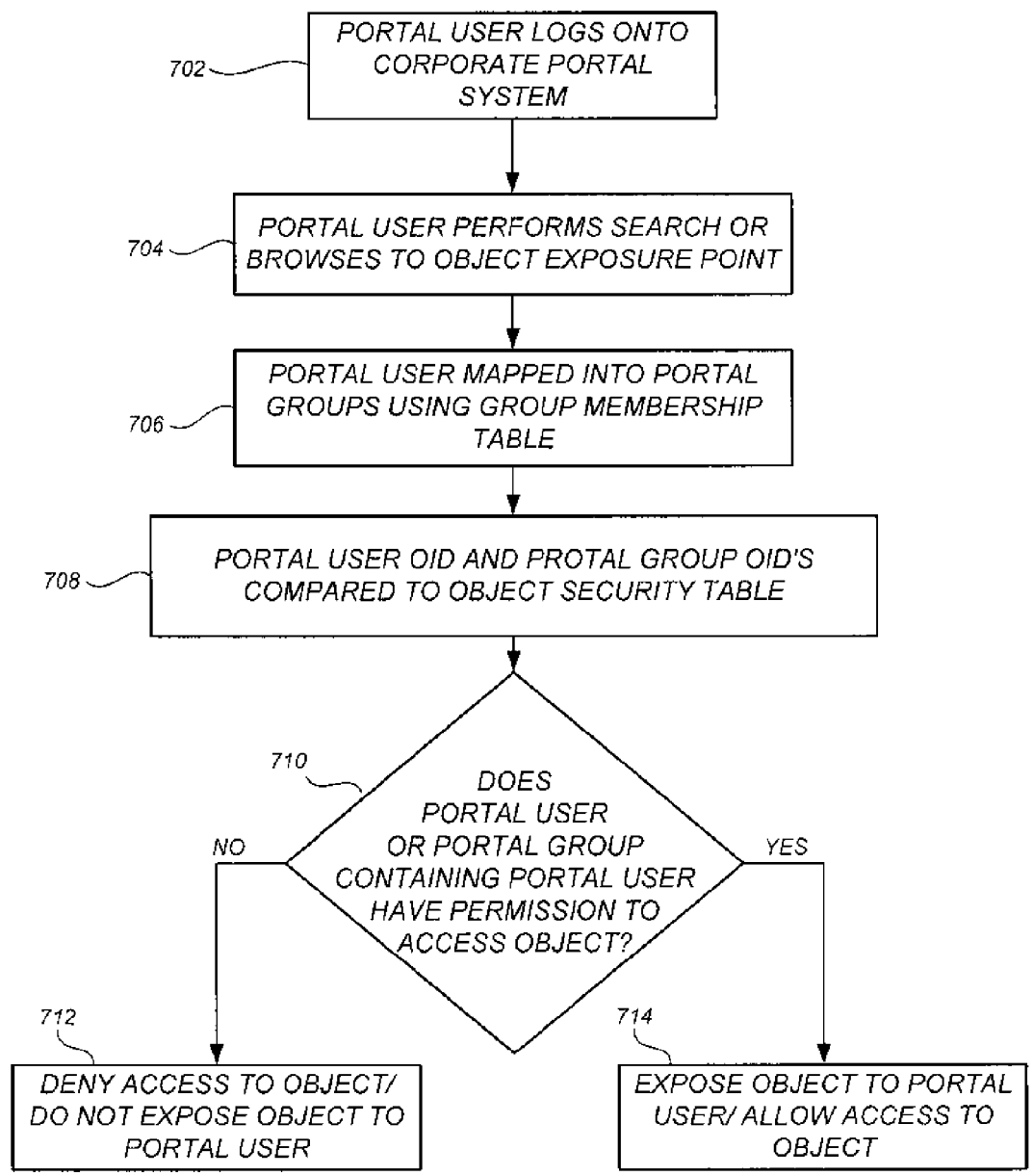
FIG. 7 illustrates steps taken during enforcement of corporate portal security settings in accordance with a preferred embodiment.

FIG. 7 illustrates steps taken during enforcement of corporate portal security settings in accordance with a preferred embodiment. At step 702, a portal user logs into the corporate portal system. At step 704, the portal user performs a search or otherwise browses to an object exposure point, that is, to a point where the existence of the object will be exposed to the portal user if access permissions are met. At step 706, portal group membership of the portal user is determined using the group membership table 606. At step 708, the OID of the portal user and the OIDs of the portal groups of which that portal user is a member are compared to the object security table 612. At step 710, it is determined whether that portal user, or any portal group containing that portal user, has access permissions to the object. If not, then at step 712 access to the object is denied, and the existence of the object is not exposed to the user. If yes, then at step 714 the user is allowed access to the object and is exposed to its existence.

Figure 8:
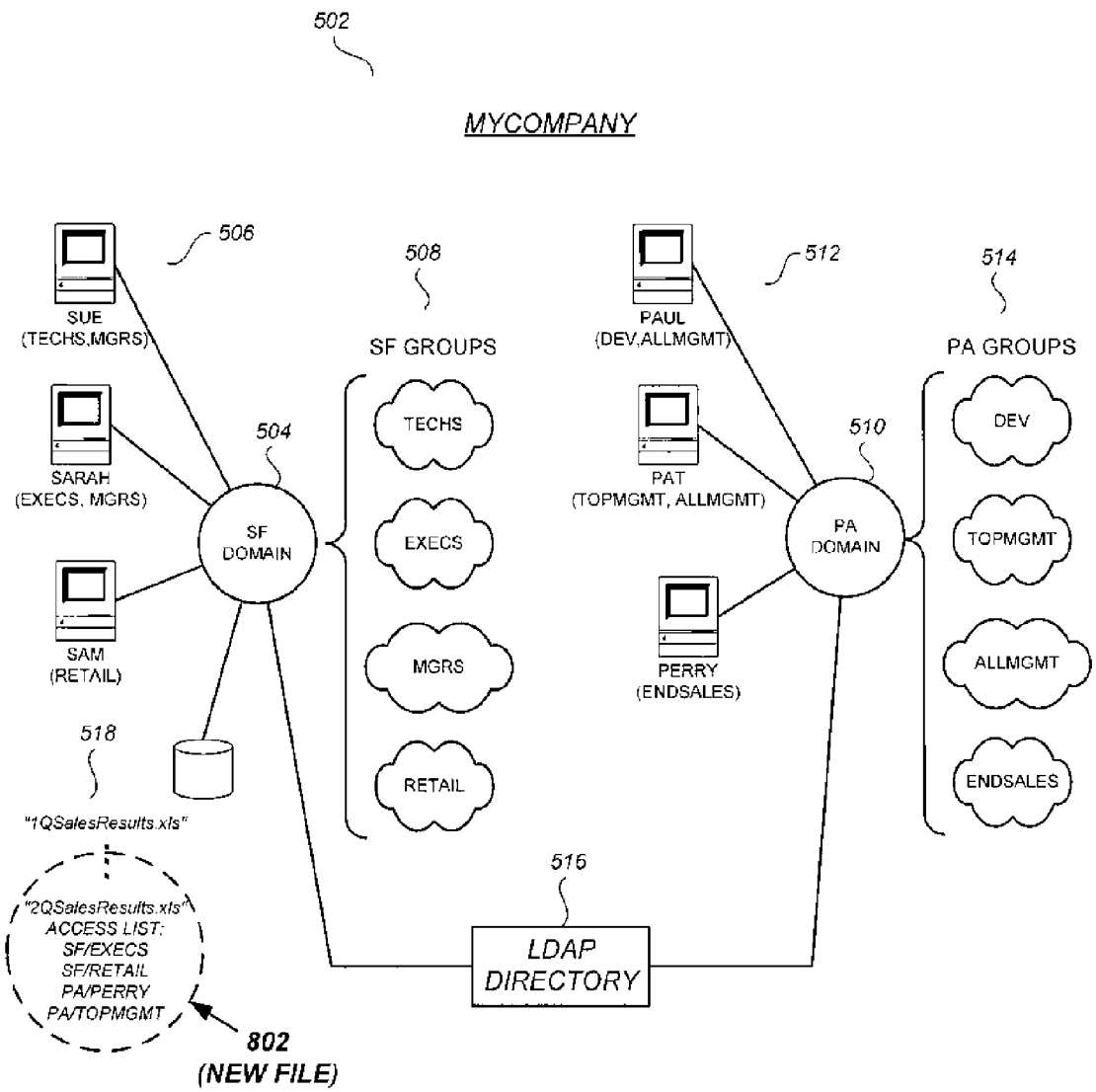
FIG. 8 illustrates an exemplary enterprise network in a second configuration for use with a corporate portal system in accordance with a preferred embodiment.

FIG. 8 illustrates the exemplary enterprise network 502 in a second configuration, wherein a new file 802 "2QSalesResults.xls" is added to the SF domain. In this example, the newly added file has the same native access permissions as the existing file "1QSalesResults.xls."

Figure 9:
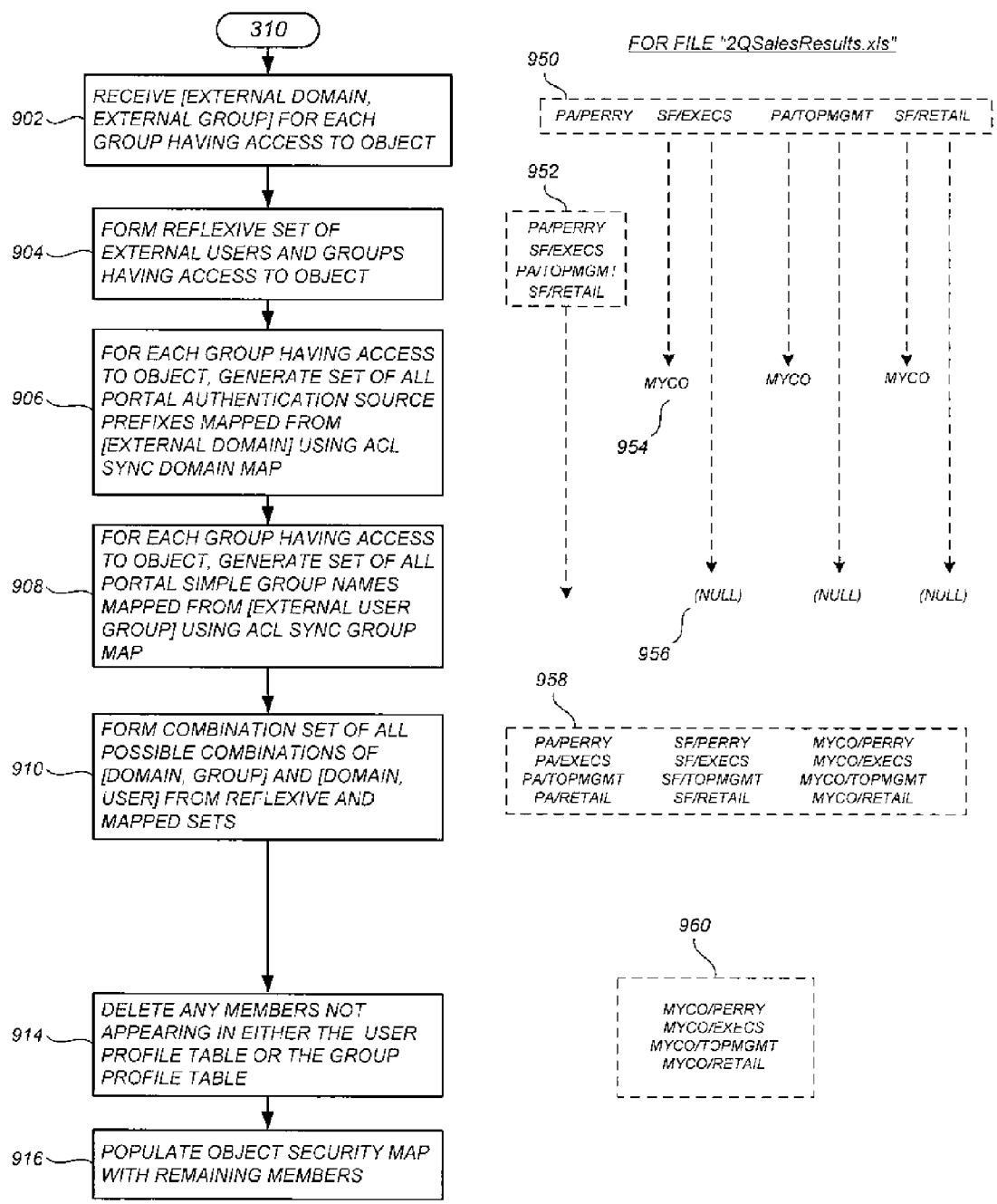
FIG. 9 illustrates steps for mapping external security information into a corporate portal system in accordance with a preferred embodiment.

FIG. 9 illustrates steps for mapping external security information corresponding to the object "2QSalesResults.xls" into the corporate portal security system in accordance with a preferred embodiment. Also shown in FIG. 9 are data listings corresponding to various stages of the security mapping. Because there are no additional users, groups, or domains, the security mapping parameters of FIG. 6 are still applicable. At step 902, the external domain identifier and external group identifiers for each group having access to the object are received from the crawler 416. These are shown as data elements 950 in FIG. 9 (PA/Perry, SF/Execs, PA/Topmgmt, and SF/Retail). At step 904, a reflexive set of external users and external groups having access to the object are formed. This results in the dataset 952 of FIG. 9. At step 906, a list 954 is created comprising all authentication source prefixes (portal domains) that can result from mapping the external domain associated with every external group having access to the object through the domain synchronization map 610. In the simple example presented, each of the SF and PA external domains simply maps into the MYCO portal domain. At step 908, again for every external group having access to the object, a list of all portal simple group names that can be mapped there through the group synchronization map 610 is generated. In the present simple example, the results are NULL because the group synchronization map 610 is not populated.

In accordance with a preferred embodiment, at step 910 a candidate list 958 is generated containing all possible pairings of (i) all domains and authentication source prefixes that resulted from the previous steps, with (ii) all external group names and portal simple group names that resulted from the previous steps. As shown in FIG. 9, even in this simple example, there are 12 such pairings. The generated candidate list 958 represents all portal entities which, if they exist, should have access to the object. At step 914, any members of the candidate set 958 that do not appear in either the user profile table 602 or the group profile table 604 are deleted, because these hypothetical pairings do not exist in the corporate portal system. At step 916, the object security table is populated with the remaining members of the candidate set. FIG. 10 shows the resulting object security table, containing the expected additional entries 1002. These entries are, of course, identical to the entries for "1QSalesResults.xls" because the native security settings were the same and because no additional groups or domains were added between the security mappings for "1QSalesResults.xls" and "2QSalesResults.xls."

Figure 11:
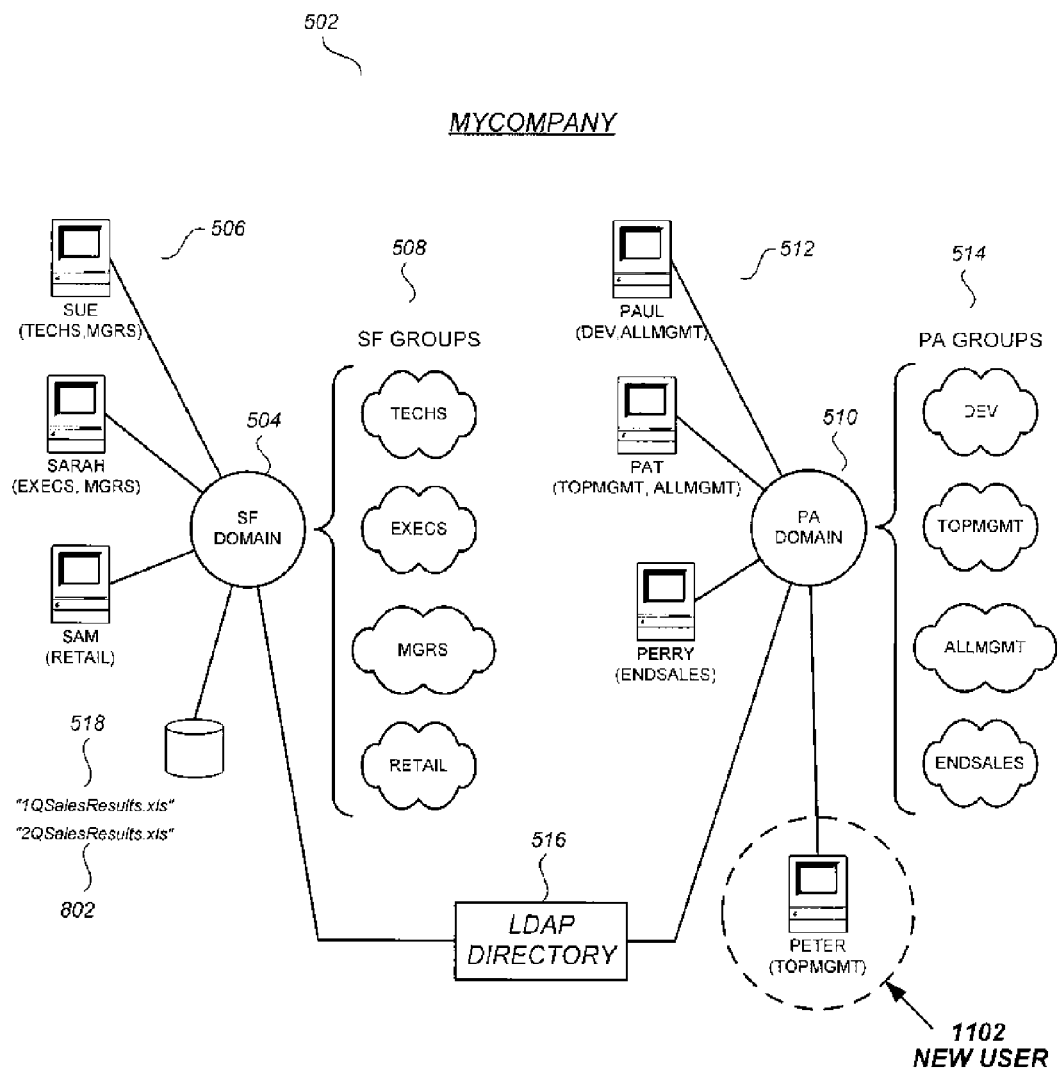
FIG. 11 illustrates an exemplary enterprise network in a third configuration for use with a corporate portal system in accordance with a preferred embodiment.

FIG. 11 illustrates the exemplary enterprise network 502 in a third configuration, wherein a new user 1102 (Peter) is added to the PA domain. Advantageously, none of the synchronization maps 608 or 610 requires modification, nor does the object security table 612. Rather, a single entry corresponding to the additional portal user is added to the user profile table (FIG. 12, element 1202) by the synchronization agent 418 upon detecting the new user, and the group membership table 606 is also updated according to the group memberships of the additional portal user (FIG. 12, element 1204). Proper object access will automatically result when the standard portal security enforcement steps of FIG. 7 are executed.

Figure 13:
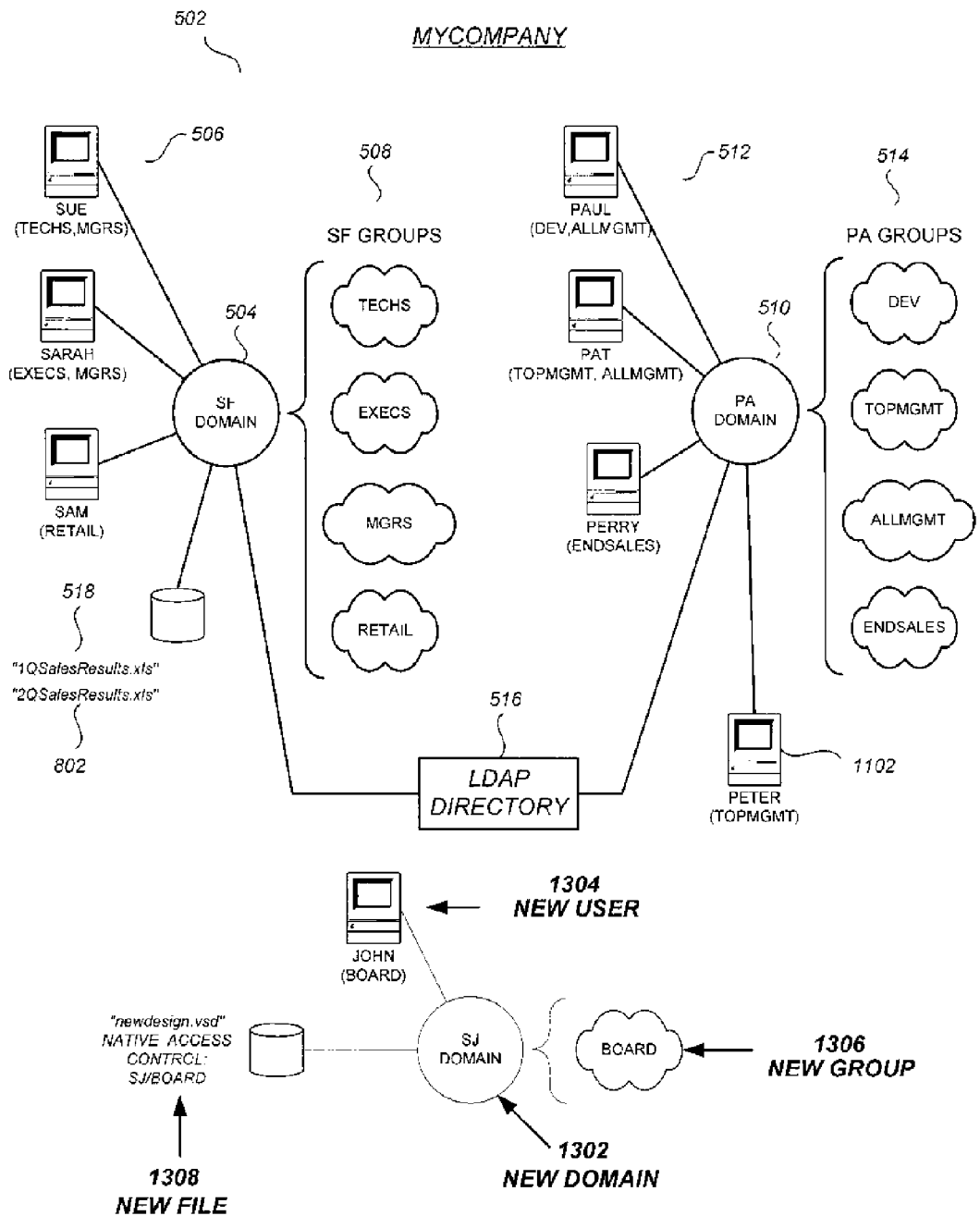
FIG. 13 illustrates an exemplary enterprise network in a fourth configuration for use with a corporate portal system in accordance with a preferred embodiment.
Figure 14:
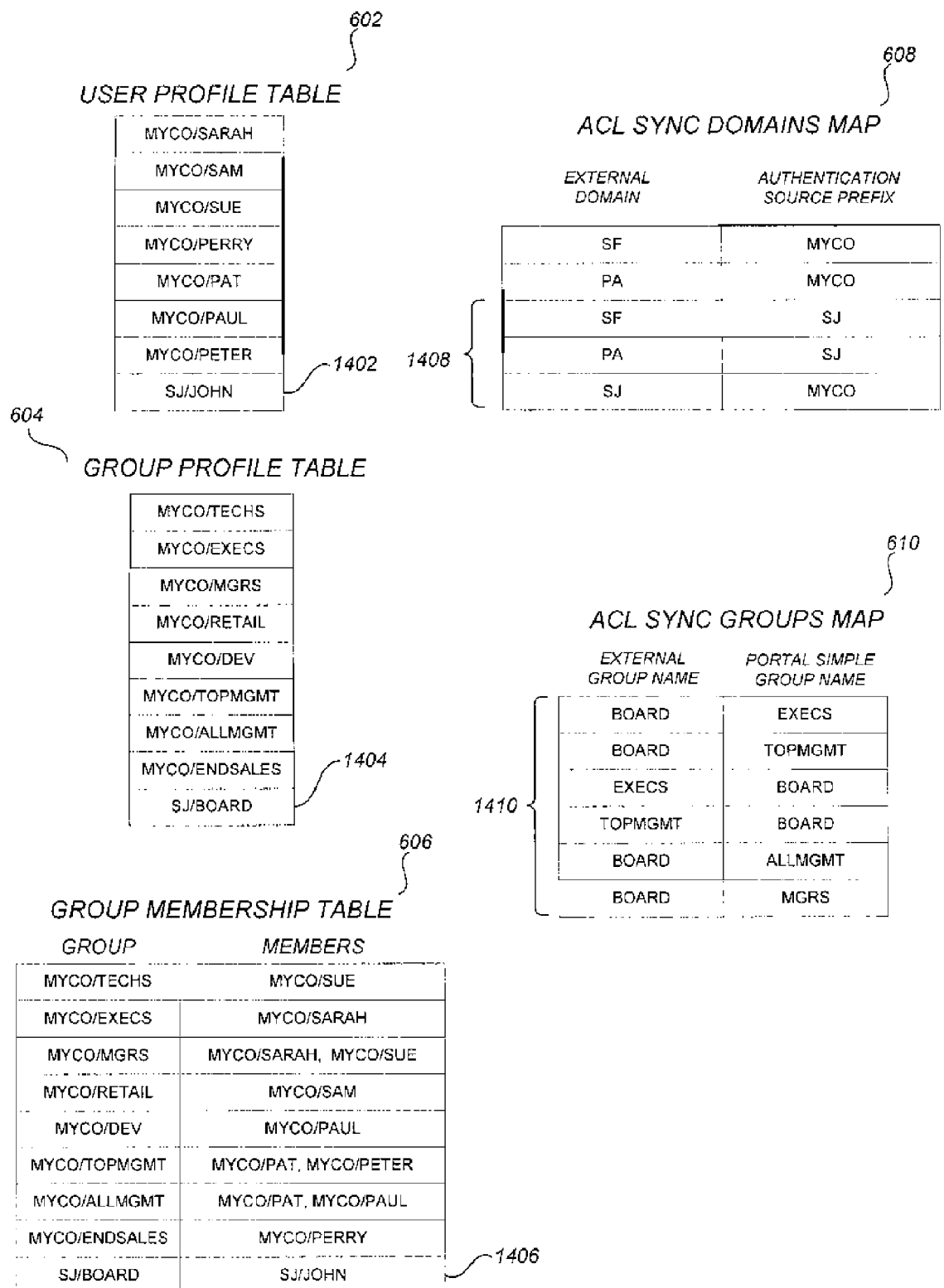
FIG. 14 illustrates database information stored in a corporate portal system corresponding to the enterprise network of FIG. 13.

FIG. 13 illustrates the exemplary enterprise network 502 in a fourth configuration, wherein a new domain 1302 ("SJ") is added, a new user 1304 (John) is added, a new group 1306 (Board) contained in the new domain is added, and wherein the new domain contains a new file 1308 ("newdesign.vsd"). The new file "newdesign.vsd" has a native access control list that is simply the single group SJ/Board. The presence of the new domain is generally an event of which portal administrators will be aware from external sources, or alternatively, the synchronization agent 418 may detect the new domain and new external group and alert the portal administrator. In accordance with a preferred embodiment, a new portal domain (authentication source prefix) "SJ" is created to accommodate the additional external domain. As shown in FIG. 14, the user profile table 602 is appended with a concatenation of the portal group and the external user name for John (SJ/John), and the group profile table 604 is appended with a concatenation of the portal group and the external group name for Board (SJ/Board). The domain synchronization map 608 is appended with entries sufficient to ensure that each external domain (SF, PA, SJ) will map into each portal domain (or authentication source prefix) (MYCO, SJ).

Advantageously, in accordance with a preferred embodiment, the portal administrator may strategically populate the group synchronization map 410 to achieve a portal security strategy appropriate to the new enterprise network addition. By way of example, the new domain 1302 may have been added to the enterprise network by virtue of a corporate acquisition of a startup company "SJ" containing one employee "John" or very few employees, but who nevertheless will end up with a high-ranking position in the acquiring company.

Advantageously, the group synchronization map 410 may be strategically manipulated to achieve the following scenario. While it would be desirable for all current managers, including lower-level managers in "Mgrs" and "Allmgmt" of the existing company, to view documents to which "Board" members have access, it may be prudent at the outset of the merger to prohibit the converse, i.e., to prohibit "Board" members from viewing documents to which the current lower-level managers have access. Rather, it would be desirable only to allow "Board" members to view documents accessible by their "Execs" and "Topmgmt" peers. This is achieved by mapping "Board" into all four management groups (Execs, Topmgmt, Allmgmt, and Mgrs) in the group synchronization map 410, but only mapping "Execs" and "Topmgmt" into Board using this in the group synchronization map 410. Notably, Allmgmt and Mgrs are not mapped into Board. The resulting security mappings outlined in FIGS. 15-18 readily show how this strategic population of the group synchronization map 410 achieves the desired access objectives.

Once the portal database 424 is updated to include the new users, groups, and domains, a file crawl process may be instantiated for the documents in the new external domain. Optionally, a file crawl process for existing objects already mapped into the portal system may be re-instantiated to update the object security map for those existing objects. Alternatively, the next regularly scheduled file crawl can take care of this. Advantageously, however, no re-manipulation of the security settings of file crawl parameters is required, because object security parameters are no longer determined by the corporate portal system (except in individual override scenarios allowed by the preferred embodiments), but rather the object security parameters are determined by mapping the native object security parameters into the portal's security system.

FIG. 15 shows data elements 1502-1512 corresponding to the mapping of native security parameters for "newdesign-.vsd" into the corporate portal system, with the steps of FIG. 9 being reiterated for the convenience of the reader. The resulting object security table is shown in FIG. 16. As desired, all managers of the existing company (MYCO/Execs, MYCO/Topmgmt, MYCO/Allmgmt, and MYCO/Mgrs) may view the document that is also viewable by the new group SJ/Board.

Figure 17:
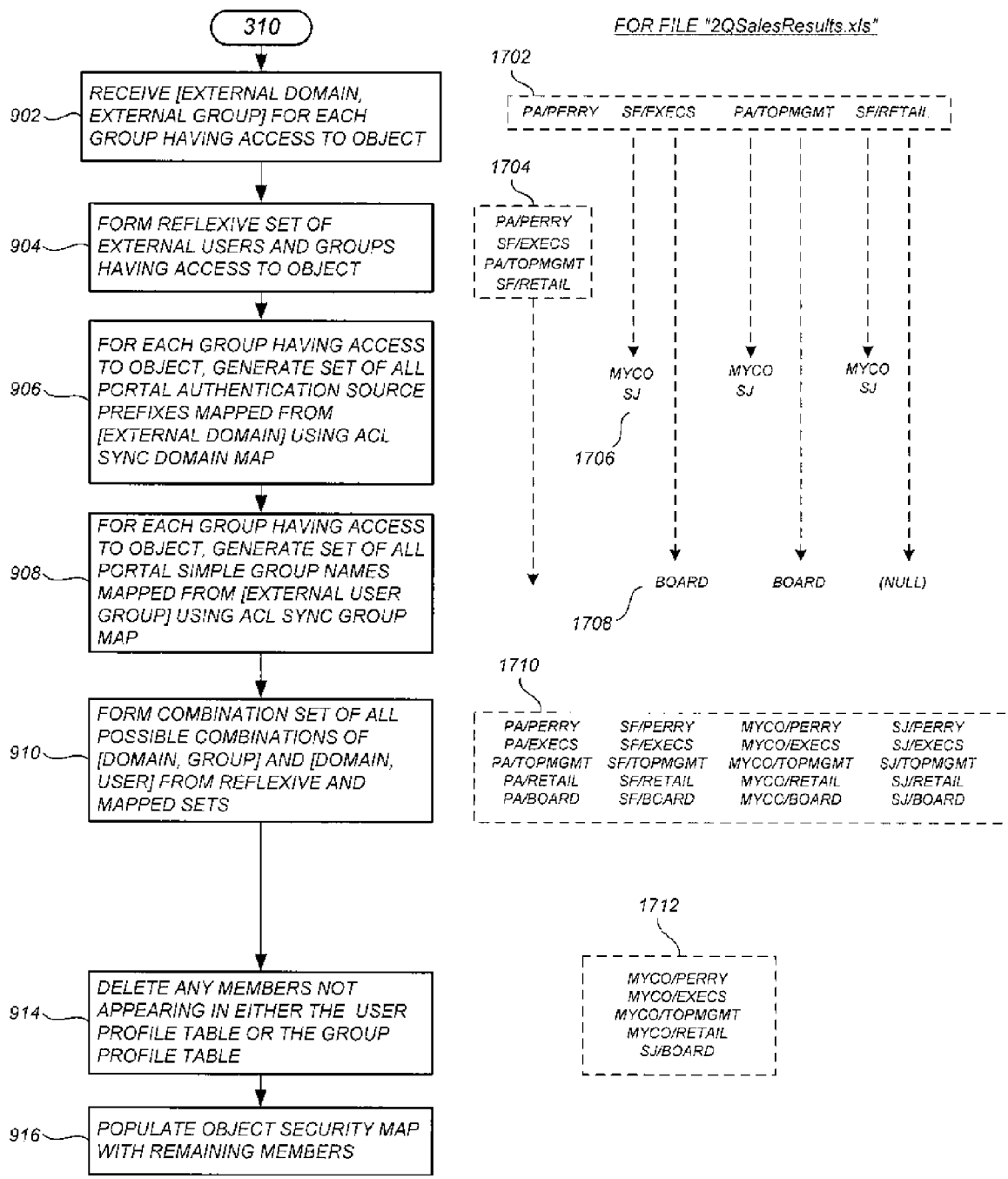
FIG. 17 illustrates steps for re-mapping external security information corresponding to an object in accordance with a preferred embodiment, the object having been imported prior to the addition of a new external domain.

FIG. 17 shows data elements 1702-1712 corresponding to the re-mapping of native security parameters for the already-imported document "2QSalesResults.xls," with the steps of FIG. 9 also being reiterated for the convenience of the reader. The resulting object security table is shown in FIG. 18. As desired, after the combinational methods and filterings of the preferred embodiments are applied, the new group SJ/Board is able to view the document "2QSalesResults.xls," as well as the previous groups that were already allowed to view the document (MYCO/Execs, MYCO/Topmgmt, MYCO/Allmgmt, and MYCO/Mgrs). This is the desired outcome because Execs and Topmgmt were already able to see the document, and SJ/Board has their viewing permissions. It would be readily seen, using the group synchronization map of FIG. 14, that the new group SJ/Board would not be able to see documents viewable only by Allmgmt and Mgrs (as desired).

It is to be appreciated that while in the examples supra each portal user (e.g., MYCO/Sarah), corresponded to an external user (e.g., SF/Sarah), the features and advantages of the preferred embodiments are also enjoyed where there are portal users not associated with external users. There may well be many users who are users of the corporate portal, but are not external users in an external domain. Thus, in the examples supra, an administrator could create a new portal user "IvanRetail," and could put IvanRetail into the MYCO/Retail group. This user would then have access to the metadata objects available to persons in the MYCO/Retail group, as well as any new metadata objects created that are based on external documents which grant permission to SF/Retail. Note that this user does not represent any external entity, but only exists in the portal domain. IvanRetail benefits from the security mappings of the preferred embodiments, because he is placed in a portal group corresponding to an external group.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

By way of example, while the utility for extracting native security information is presented supra as being part of the crawler, it is to be appreciated that such utility may be provided as a separate component, and may even run on a machine separate from the crawler. By way of further example, while the examples provided supra are in the context of the mapping of group security settings upon object import, the preferred embodiments are readily applicable to the mapping of user security settings as well.

By way of further example, it would be within the scope of the preferred embodiments to dynamically access the external security information for an object from its native domain whenever that object initially matches a user search or request. The prescribed methods supra for mapping native security information to the portal security system may then occur "on the fly," thereby obviating or supplementing the object security table.

By way of further example, the preferred embodiments supra are readily applicable to scenarios in which groupings can be made of groups themselves, i.e., in which "groups of groups" are supported. By way of further example, the preferred embodiments for establishing security settings described supra are readily applicable beyond the corporate portal environment and may be advantageously used in the context of public portals, for example, having predetermined agreements with public content providers and user-settable options for invoking different object security features. Therefore, reference to the details of the preferred embodiments are not intended to limit their scope, which is limited only by the scope of the claims set forth below.

What is claimed is:

1. A method for administering portal security, comprising:
   detecting with a group of synchronization agents of a portal system added or changed users or groups on an enterprise network;
   populating by the portal system in response to and based on detecting added or changed users or groups on the enterprise network, profile information for the added or changed users or groups;
   importing an object to the portal system based on the profile information for the added or changed users or groups;
   extracting with the portal system a native security setting from a native environment of the object;
   mapping the native security setting into a portal security setting associated with a portal that comprises a metadata object, the mapping being according to a predetermined process that is executed according to one or more synchronization maps that map external groups or domains, or both, to one or more intermediate sets of identifiers and that are maintained in a portal database;

associating in the portal system said portal security setting with the object;

instantiating with the portal system a predetermined security relationship between the metadata object and the corresponding native security setting; and granting with the portal system viewing or exposure access to the object by a particular user or group, or combinations thereof, wherein the method is executed by a processor.

2. The method of claim 1, wherein the native security setting comprises an identity of an entity external to the portal having a predetermined security relationship with the object in its native environment, and wherein the mapping comprises mapping the external entity into a corresponding portal entity.

3. The method of claim 2, wherein said predetermined security relationship comprises viewing access.

4. The method of claim 2, wherein the native security setting comprises the predetermined security relationship with the object in its native environment.

5. The method of claim 1, wherein said one or more synchronization maps comprises:

a first synchronization map that maps external domains to an intermediate set of domain identifiers; and a second synchronization map that maps external groups to an intermediate set of group identifiers.

6. The method of claim 5, wherein a portal user is identified by a concatenation of a portal domain identifier and a user name used by the external domain of the portal user, and wherein a portal group is identified by a concatenation of a portal domain identifier and a group name used by the external domain of the portal group.

7. The method of claim 6, said predetermined mapping process comprising:

forming a reflexive set of external users and external groups having access to the object, each member of the reflexive set being expressed as a concatenation of the external domain and the external user or external group;

mapping each external domain indicated in each of the external users and external groups into to one or more portal domains using the first synchronization map;

mapping each external group to one or more portal simple group names using the second synchronization map;

forming a candidate set of all possible pairings between (i) all indicated external and portal domains, and (ii) all indicated external group and portal simple group names;

comparing the candidate set to portal user and portal group information; and deleting from the candidate set any member not appearing in said portal user and portal group information;

wherein the remaining members of the candidate set represent the corresponding portal users and portal groups having access to the object.

8. The method of claim 1, wherein each synchronization agent of the group of synchronization agents is periodically instantiated to detect added or changed users or groups on the enterprise network.

9. The method of claim 8, wherein the group of synchronization agents instantiated depends upon a type of external domain directory structure examined.

10. A corporate portal apparatus, comprising one or more processor readable storage devices having processor readable code embodied thereon for programming a one or more processors to perform a method of administering portal security for an object, said processor readable code comprising component modules including:

a group of synchronization agents for detecting added or changed users or groups on an enterprise network, populating in response to and based on detecting added or changed users or groups on the enterprise network profile information for the added or changed users or groups, and importing external object in external domains based on the profile information for the added or changed users or groups;

a crawler for accessing the external objects in the external domains;

a security extraction utility for extracting native security information corresponding to the external objects from one or more security systems of the external domains; and a database comprising information for mapping according to a predetermined process that is executed according to one or more synchronization maps that map external groups or domains, or both, to one or more intermediate sets of identifiers, and that are maintained in a portal database, wherein the apparatus comprises said one or more processors for performing said method which further includes instantiating a predetermined security relationship between a metadata object and the corresponding native security setting, and wherein a security system of the corporate portal regulates exposure of portal metadata objects corresponding to the external objects based on the mapped security information.

11. The corporate portal apparatus of claim 10, further comprising a synchronization agent for accessing external user and external group information from the external domains, wherein said database comprises information derived at least in part from said external user and external group information.

12. The corporate portal apparatus of claim 11, further comprising an administrative user interface for assisting a portal administrator in populating said database using information that includes said external user information and said external group information.

13. The corporate portal apparatus of claim 12, wherein said synchronization agent is adapted and configured to extract user and group information from external domains.

14. A computer readable memory having stored thereon a series of instructions which, when executed by a processor, cause the processor to administer portal security for an object, by:

detecting added or changed users or groups on an enterprise network;

populating in response to and based on detecting added or changed users or groups on the enterprise network, profile information for the added or changed users or groups;

importing the object based on the profile information for the added or changed users or groups;

extracting a native security setting from a native environment of the object;

mapping the native security setting into a portal security setting associated with a portal comprising a metadata object, the mapping being according to a predetermined process that is executed according to one or more synchronization maps that map external groups or domains, or both, to one or more intermediate sets of identifiers, and that are maintained in a portal database;

associating in the portal said portal security setting with the object;

instantiating a predetermined security relationship between a metadata object and the corresponding native security setting; and granting viewing or exposure access to the object by a particular user or group, or combinations thereof.

15. The computer readable memory of claim 14, wherein the native security setting comprises an identity of an entity external to the portal having a predetermined security relationship with the object in its native environment, and wherein the mapping comprises mapping the external entity into a corresponding portal entity.

16. The computer readable memory of claim 15, wherein said predetermined security relationship comprises viewing access.

17. The computer readable memory of claim 15, wherein the native security settings have the predetermined security relationship with the object in its native environment.

18. The computer readable memory of claim 17, wherein said one or more maps comprises:
   a first synchronization map that maps external domains to an intermediate set of domain identifiers; and
   a second synchronization map that maps external groups to an intermediate set of group identifiers.

19. The computer readable memory of claim 18, wherein a portal user is identified by a concatenation of a portal domain identifier and a user name used by the external domain of the portal user, and wherein a portal group is identified by a concatenation of a portal domain identifier and a group name used by the external domain of the portal group.

20. The computer readable memory of claim 19, said computer code for mapping the external users and external groups into corresponding portal users and groups according to a predetermined mapping process comprising:
   computer code for forming a reflexive set of external users and external groups having access to the object, each member of the reflexive set being expressed as a concatenation of the external domain and the external user or external group;
   computer code for mapping each external domain indicated in each of the external users and external groups into to one or more portal domains using the first synchronization map;
   computer code for mapping each external group to one or more portal simple group names using the second synchronization map;
   computer code for forming a candidate set of all possible pairings between (i) all indicated external and portal domains, and (ii) all indicated external group and portal simple group names;
   computer code for comparing the candidate set to portal user and portal group information; and
   computer code for deleting from the candidate set any member not appearing in said portal user and portal group information, wherein the remaining members of the candidate set represent the corresponding portal users and portal groups having access to the object.

* * * * *

UNITED STATES PATENT AND TRADEMARK OFFICE
CERTIFICATE OF CORRECTION

PATENT NO.        : 8,281,404 B2
APPLICATION NO.   : 11/308377
DATED             : October 2, 2012
INVENTOR(S)       : Frey et al.

It is certified that error appears in the above-identified patent and that said Letters Patent is hereby corrected as shown below:

On Title page 2, Item (56) under "Other Publications", line 2-4, delete "IBM Tivoli Access Manager for Business Integration, http://www.tivoli.com/products/index/access-mgr-bus-Integration/." and insert the same on Page 2, Col. 2, Line 3, as a new entry.

On Title page 2, Item (56) under "Other Publications", line 12, delete "http://www/rsasecurity.com/products/cleartrust/." and insert -- http://www.rsasecurity.com/products/cleartrust/. --, therefor.

On sheet 7 of 18, in figure 7, Box. 708, line 1, delete "PROTAL" and insert -- PORTAL --, therefor.

In column 14, line 1-9, delete "IvanRetail into .......... an external group." and insert the same on Col. 13, line 67, after "could put" as a continuation of the same paragraph.

In column 15, line 41, in Claim 7, after "into" delete "to".

In column 18, line 12, in Claim 20, after "into" delete "to".

Signed and Sealed this
Fifteenth Day of January, 2013

David J. Kappos
*Director of the United States Patent and Trademark Office*